(12) United States Patent
Yasuda

(10) Patent No.: US 7,593,052 B2
(45) Date of Patent: Sep. 22, 2009

(54) IMAGE SENSING APPARATUS HAVING A FOCUS ADJUSTMENT DEVICE, AND CONTROL METHOD THEREOF

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 10/350,454

(22) Filed: Jan. 24, 2003

(65) Prior Publication Data

US 2003/0169457 A1 Sep. 11, 2003

(30) Foreign Application Priority Data

Jan. 25, 2002 (JP) ............... 2002/016773

(51) Int. Cl.
*H04N 5/232* (2006.01)
*G03B 13/00* (2006.01)

(52) U.S. Cl. .................. 348/346; 348/345; 348/351
(58) Field of Classification Search ......... 348/345–357, 348/296, 295
See application file for complete search history.

(56) References Cited

U.S. PATENT DOCUMENTS 5,638,217 A * 6/1997 Hirasawa et al. ............ 359/698

6,967,686 B1 * 11/2005 Tanaka ....................... 348/352
2002/0075395 A1 * 6/2002 Ohkawara .................. 348/347
2003/0011699 A1 * 1/2003 Tanizoe et al. .......... 348/333.07

FOREIGN PATENT DOCUMENTS

JP 09823806 * 4/1994
JP 11-252434 * 9/1999

* cited by examiner

*Primary Examiner*—Kelly L Jerabek
(74) *Attorney, Agent, or Firm*—Cowan, Liebowitz & Latman, P.C.

(57) ABSTRACT

This invention has as its object to prevent a conventional problem in that the focal point position cannot be determined before and after an in-focus point, even in a slow shutter mode. To this end, a camera control microcomputer of a video camera determines the drive amount of a focus lens for one field in accordance with the rotation angle of a manual focus dial when the shutter speed is ⅙₀ sec, ⅓₀ sec, or ⅟₁₅ sec, and controls a focus compensation lens driver and focus compensation lens motor to drive the focus lens by the determined drive amount in a direction corresponding to the detected rotation direction of the manual focus dial.

11 Claims, 5 Drawing Sheets

IMAGE SENSING APPARATUS HAVING A FOCUS ADJUSTMENT DEVICE, AND CONTROL METHOD THEREOF

FIELD OF THE INVENTION

The present invention relates to a focus adjustment apparatus, an image sensing apparatus, a focus adjustment method, a control program for a focus adjustment apparatus, and a storage medium and, more particularly, to a focus adjustment apparatus, an image sensing apparatus, a focus adjustment method, a control program for a focus adjustment apparatus, and a storage medium, which can attain manual focus adjustment used in various video cameras, and especially in a slow shutter mode.

BACKGROUND OF THE INVENTION

In conventional video cameras, a system for recording a standard television signal obtained by photoelectrically converting an object image by an image sensing element has prevailed. It is a common practice to execute photoelectric conversion for a time corresponding to one period (field period) of a vertical synchronization signal of the standard television signal. However, a sufficient exposure time cannot often be assured within a predetermined field period, and a frame may suffer underexposure. To prevent such problem, especially in a low illuminance environment, a technique called slow shutter is put into practical use. With this technique, the exposure time of the image sensing element can be longer than one field period by devising the photoelectric conversion timing, and using an image memory.

The arrangement of an actual video camera will be described in detail below with reference to FIG. 1. Reference numeral 101 denotes a stationary first group lens; 102, a zoom lens that attains zooming; 103, an aperture; 104, a stationary second group lens; and 105, a focus compensation lens (to be referred to as a focus lens hereinafter) which has both a function of correcting movement of a focal plane upon zooming, and a focus adjustment function. Reference numeral 106 denotes a focus compensation lens motor as an actuator for moving the focus lens 105; and 107, a focus compensation lens driver for driving the focus compensation lens motor 106 in accordance with a signal from a camera control microcomputer 114 to be described later. Reference numeral 108 denotes a CCD serving as an image sensing element; and 109, a CCD drive circuit for driving the CCD 108. Reference numeral 110 denotes a camera signal processing circuit which processes an output signal from the CCD 108 to obtain a signal that is compatible to a recording device 112 to be described later.

Reference numeral 111 denotes an image memory, which stores a video signal from the camera signal processing circuit 110 as needed, and outputs the stored video signal to the recording device 112 to be described below. Reference numeral 112 denotes the recording device, which records an output signal from the image memory 111 for one field period. Nowadays, a magnetic tape is normally used as a recording medium. Reference numeral 113 denotes a display device which displays an output from the image memory 111. Reference numeral 114 denotes the camera control microcomputer, which controls the CCD drive circuit 109 and camera signal processing circuit 110, and sends a signal for driving the focus lens 105 to the driver 107 in accordance with an input from a manual focus dial 115 to be described below. Reference numeral 115 denotes the manual focus dial which converts rotation of a member into an electrical signal, and inputs the electrical signal to the camera control microcomputer 114.

In the video camera system with the arrangement shown in FIG. 1, the camera control microcomputer 114 generates a video signal by controlling the CCD drive circuit 109 and camera signal processing circuit 110, and sends a signal for driving the focus lens 105 to the focus compensation lens driver 107 in accordance with the input from the manual focus dial 115.

The slow shutter control of the video camera system will be explained below. The CCD drive circuit 109 normally drives the CCD 108 to make photoelectric conversion for one field period. However, in a low-illuminance environment, the CCD drive circuit 109 drives the CCD 108 to make photoelectric conversion after exposure across a plurality of fields, the output from the CCD 108 is processed by the camera signal processing circuit 110, the video signal is stored in the image memory 111, and the video signal is read out from the image memory 111 for one field period and is output to the recording device 112, as shown in FIG. 2. In this way, an image changes every plurality of field periods, but a bright image can be obtained. Note that the bracketed numbers in FIG. 2 indicate respective images.

Lastly, the manual focus control of the video camera system will be explained below. The camera control microcomputer 114 reads an electrical signal obtained by converting rotation of the manual focus dial 115, and sends a signal for driving the focus lens 105 in proportion to a change in electrical signal corresponding to the rotation amount of the manual focus dial 115 to the focus compensation lens driver 107, thus attaining the manual focus control. A photographer operates the manual focus dial 115 while observing the display contents on the display device 113, so as to attain manual focus operation.

FIG. 5 shows the control of the camera control microcomputer 114 at that time. This process is controlled to start from step S501 and to return to step S501 within one field. In step S501, the rotation direction and angle of the manual focus dial 115 in one field are detected. In step S502, the drive amount of the focus lens 105 for one field is determined in accordance with the rotation angle of the manual focus dial 115. In step S503, the focus lens 105 is driven by the drive amount determined in step S502 in a direction corresponding to the rotation direction detected in step S501. In this manner, the manual focus control is attained.

However, the conventional system suffers the following problem. Since the update period of a video signal is prolonged and it takes a long time until the photographer observes a video corresponding to his or her manual focus operation in the slow shutter mode, the focus lens has already overshot an in-focus position when an image in an in-focus state is output. For this reason, even when the photographer realizes such state and makes manual focus operation in the reverse direction, the focus lens repetitively overshoots an in-focus position, and the focal point position cannot be determined before and after an in-focus point.

SUMMARY OF THE INVENTION

The present invention has been made in consideration of the above situation, and has as its object to provide a focus adjustment apparatus, an image sensing apparatus, a focus adjustment method, a control program for a focus adjustment apparatus, and a storage medium, which can prevent the conventional problem (i.e., the focal point position cannot be determined before and after an in-focus point) even in a slow shutter mode, and can reliably adjust a focal point to an in-focus point.

In order to achieve the above object, according to the first aspect of the present invention, a focus adjustment apparatus is characterized by comprising a focus adjustment device that drives to adjust a focal point of an image sensing optical system corresponding to a manual operation, and a change device that changes a focus adjustment drive speed of the focus adjustment device corresponding to the manual operation in accordance with a cycle in which an image sensing device converts an object image received via the image sensing optical system into an image signal.

According to the second aspect of the present invention, a focus adjustment apparatus is characterized by comprising a focus adjustment device that drives to adjust a focal point of an image sensing optical system corresponding to a manual operation, and a change device that changes a response time of the focus adjustment device to the manual operation in accordance with a cycle in which an image sensing device converts an object image received via the image sensing optical system into an image signal.

According to the third aspect of the present invention, a focus adjustment method for driving to adjust a focal point of an image sensing optical system corresponding to a manual operation, is characterized by comprising the step of changing a focus adjustment drive speed corresponding to the manual operation in accordance with a cycle in which an image sensing device converts an object image received via the image sensing optical system into an image signal.

According to the fourth aspect of the present invention, a focus adjustment method for driving to adjust a focal point of an image sensing optical system corresponding to a manual operation, is characterized by comprising the step of changing a focus adjustment drive time corresponding to the manual operation in accordance with a cycle in which an image sensing device converts an object image received via the image sensing optical system into an image signal.

According to the fifth aspect of the present invention, a control program for a focus adjustment apparatus for driving to adjust a focal point of an image sensing optical system corresponding to a manual operation, is characterized by comprising the step of changing a focus adjustment drive speed corresponding to the manual operation in accordance with a cycle in which an image sensing device converts an object image received via the image sensing optical system into an image signal.

According to the sixth aspect of the present invention, a control program for a focus adjustment apparatus for driving to adjust a focal point of an image sensing optical system corresponding to a manual operation, is characterized by comprising the step of changing a focus adjustment drive time corresponding to the manual operation in accordance with a cycle in which an image sensing device converts an object image received via the image sensing optical system into an image signal.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

An outline of an embodiment of the present invention will be explained first.

The embodiment of the present invention can prevent a focus lens from overshooting an in-focus position upon outputting an in-focus image due to its low moving speed in a slow shutter mode that sets the exposure time of an image sensing element to be longer than one field period by changing control for moving the focus lens (by changing the moving amount of the focus lens per unit time or changing the control period of the focus lens) in accordance with a photoelectric conversion period in which an optical image is converted into an electrical signal in a predetermined period in a video camera, i.e., can prevent the conventional problem that the focus lens repetitively overshoots an in-focus position, and a focal point position cannot be determined before and after an in-focus point even when the photographer recognizes such state and makes manual focus operation in the reverse direction, and can reliably adjust the focal point to an in-focus point.

Preferred embodiments of the present invention will be described in detail hereinafter with reference to the accompanying drawings.

First Embodiment

Figure 1:
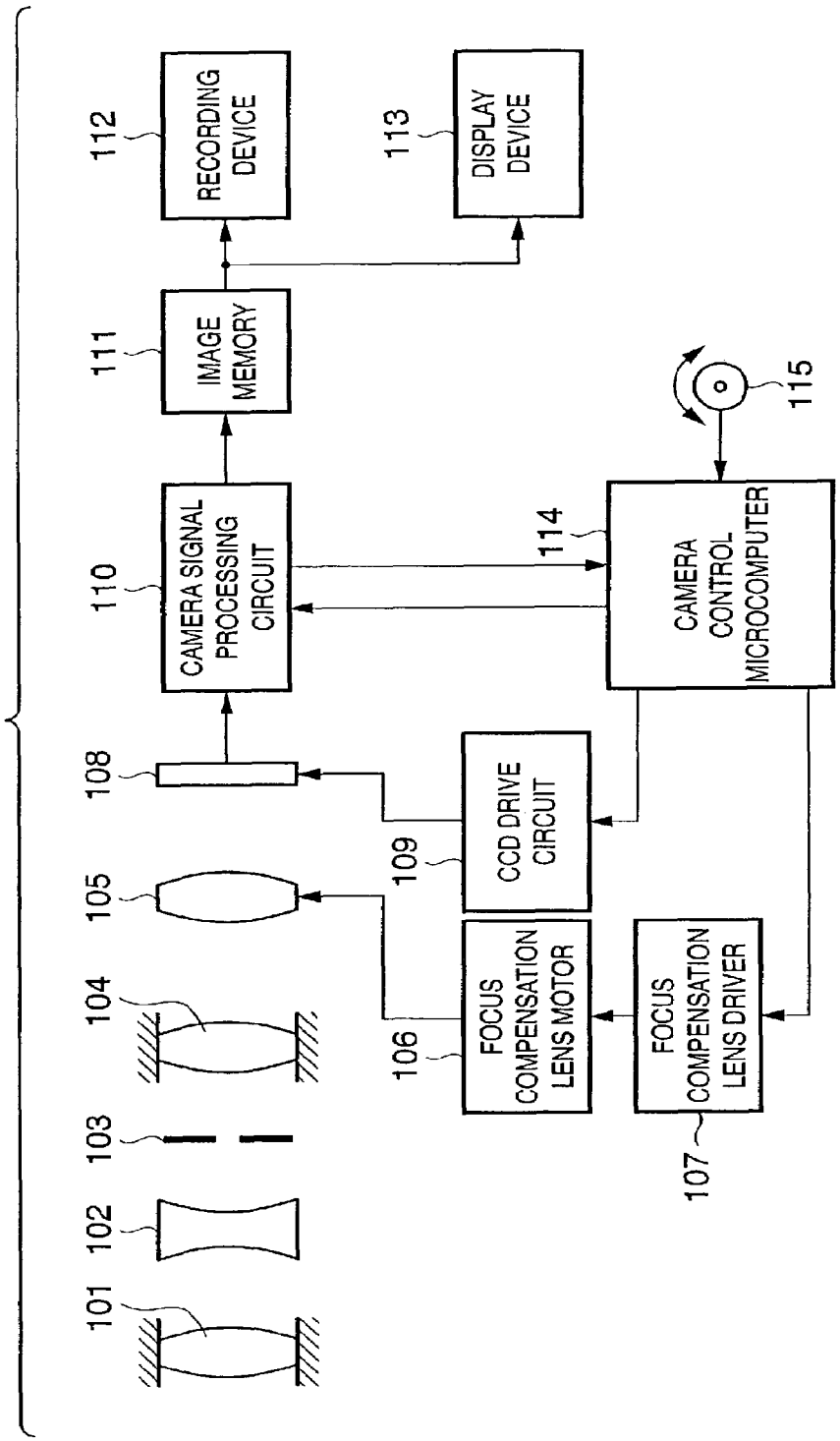
FIG. 1 is a block diagram showing the arrangement of a video camera according to the first and second embodiments of the present invention.

FIG. 1 is a block diagram showing the arrangement of a video camera according to the first embodiment of the present invention. The video camera comprises a stationary first group lens 101, zoom lens 102, aperture 103, stationary second group lens 104, focus compensation lens (to be referred to as a focus lens hereinafter) 105, focus compensation lens motor 106, focus compensation lens driver 107, CCD 108, CCD drive circuit 109, camera signal processing circuit 110, image memory 111, recording device 112, display device 113, camera control microcomputer 114, and manual focus dial 115.

Since the basic arrangement of the video camera of the first embodiment is the same as that of the prior art, a detailed description thereof will be omitted. In the first embodiment, for the sake of simplicity, a television system for recording a standard television signal obtained by photoelectrically converting an object image in a video camera is NTSC (National Television System Committee, field period=1/60 sec), and a shutter speed is limited to 1/60 sec, 1/30 sec (two fields), and 1/15 sec (four fields) in the following description. However, any other shutter speeds may be used if other field periods are used or if the shutter speed corresponds to an integer multiple of such field period.

The operation of the video camera of the first embodiment with the above arrangement will be described in detail below with reference to FIGS. 1, 2, and 3. Note that the camera control microcomputer 114 of the video camera executes the process shown in the flow chart of FIG. 3 on the basis of a control program which is stored in the video camera or a control program which is supplied from a device outside the video camera.

Figure 3:
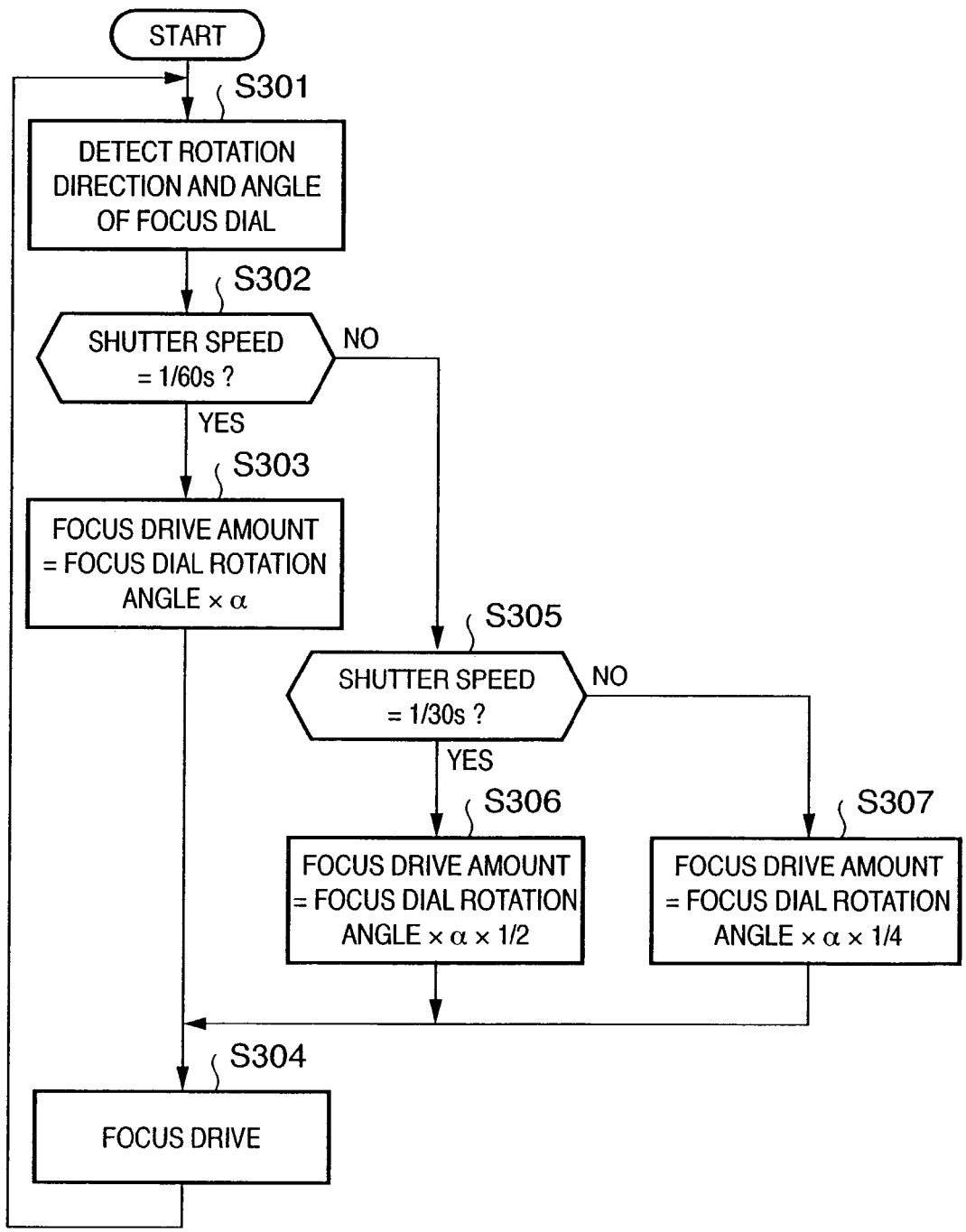
FIG. 3 is a flow chart showing the control sequence of a camera control microcomputer in the video camera according to the first embodiment.

The process shown in the flow chart of FIG. 3 is controlled to start from step S301 and to return to step S301 within one field. In step S301, the camera control microcomputer 114 detects the rotation direction and angle of the manual focus dial 115 for one field. The camera control microcomputer 114 checks in step S302 if the shutter speed is 1/60 sec. If the shutter speed is 1/60 sec, the flow advances to step S303; otherwise, the flow advances to step S305.

If the shutter speed is 1/60 sec, the camera control microcomputer 114 determines the drive amount of the focus lens 105 for one field in accordance with the rotation angle of the manual focus dial 115 in step S303. That is, the drive amount of the focus lens 105 for one field=the rotation angle of the manual focus dial 115×α (α: a conversion coefficient (constant)). In step S304, the camera control microcomputer 114 controls the focus compensation lens driver 107 and focus compensation lens motor 106 to drive the focus lens 105 by the drive amount determined in step S303 in a direction corresponding to the rotation direction of the manual focus dial 115 detected in step S301.

On the other hand, if the shutter speed is not 1/60 sec, the camera control microcomputer 114 checks in step S305 if the shutter speed is 1/30 sec. If the shutter speed is 1/30 sec, the flow advances to step S306; otherwise, the flow advances to step S307.

If the shutter speed is 1/30 sec, the camera control microcomputer 114 determines the drive amount of the focus lens 105 for one field to be 1/2 that in step S303 in accordance with the rotation angle of the manual focus dial 115 in step S306. That is, the drive amount of the focus lens 105 for one field=the rotation angle of the manual focus dial 115×α×1/2. In step S304, the camera control microcomputer 114 controls the focus compensation lens driver 107 and focus compensation lens motor 106 to drive the focus lens 105 by the drive amount determined in step S306 in a direction corresponding to the rotation direction of the manual focus dial 115 detected in step S301.

On the other hand, if the shutter speed is not 1/30 sec, since it is determined in this embodiment that the shutter speed is 1/15 sec, the camera microcomputer 114 determines the drive amount of the focus lens 105 for one field to be 1/4 that in step S303 in accordance with the rotation angle of the manual focus dial 115 in step S307. That is, the drive amount of the focus lens 105 for one field=the rotation angle of the manual focus dial 115×α×1/4. In step S304, the camera control microcomputer 114 controls the focus compensation lens driver 107 and focus compensation lens motor 106 to drive the focus lens 105 by the drive amount determined in step S307 in a direction corresponding to the rotation direction of the manual focus dial 115 detected in step S301.

As described above, according to the first embodiment, since the control for determining the drive amount of the focus lens 105 for one field is done in accordance with the photoelectric conversion period, an optimal manual focus moving amount per field that matches the shutter speed in the slow shutter mode can be implemented, as shown in FIG. 2(b) and, hence, the moving amount of the focus lens 105 can be smaller than that at a normal shutter speed shown in FIG. 2(a). Therefore, the conventional problem that the focus lens repetitively overshoots an in-focus position, and the focal point position cannot be determined before and after an in-focus point even when the photographer recognizes such state and makes manual focus operation in the reverse direction can be prevented, and the focal point can be reliably adjusted to an in-focus point.

Second Embodiment

A video camera according to the second embodiment of the present invention comprises a stationary first group lens 101, zoom lens 102, aperture 103, stationary second group lens 104, focus compensation lens (to be referred to as a focus lens hereinafter) 105, focus compensation lens motor 106, focus compensation lens driver 107, CCD 108, CCD drive circuit 109, camera signal processing circuit 110, image memory 111, recording device 112, display device 113, camera control microcomputer 114, and manual focus dial 115, as in the first embodiment (see FIG. 1).

Since the basic arrangement of the video camera of the second embodiment is the same as that of the prior art, a detailed description thereof will be omitted. In the second embodiment, for the sake of simplicity, a television system for recording a standard television signal obtained by photoelectrically converting an object image in a video camera is NTSC (National Television System Committee, field period=1/60 sec), and a shutter speed is limited to 1/60 sec, 1/30 sec (two fields), and 1/15 sec (four fields) in the following description. However, any other shutter speeds may be used if other field periods are used or if the shutter speed corresponds to an integer multiple of such field period.

The operation of the video camera of the second embodiment with the above arrangement will be described in detail below with reference to FIGS. 1, 2, and 4. Note that the camera control microcomputer 114 of the video camera executes the process shown in the flow chart of FIG. 4 on the basis of a control program which is stored in the video camera or a control program which is supplied from a device outside the video camera.

Figure 4:
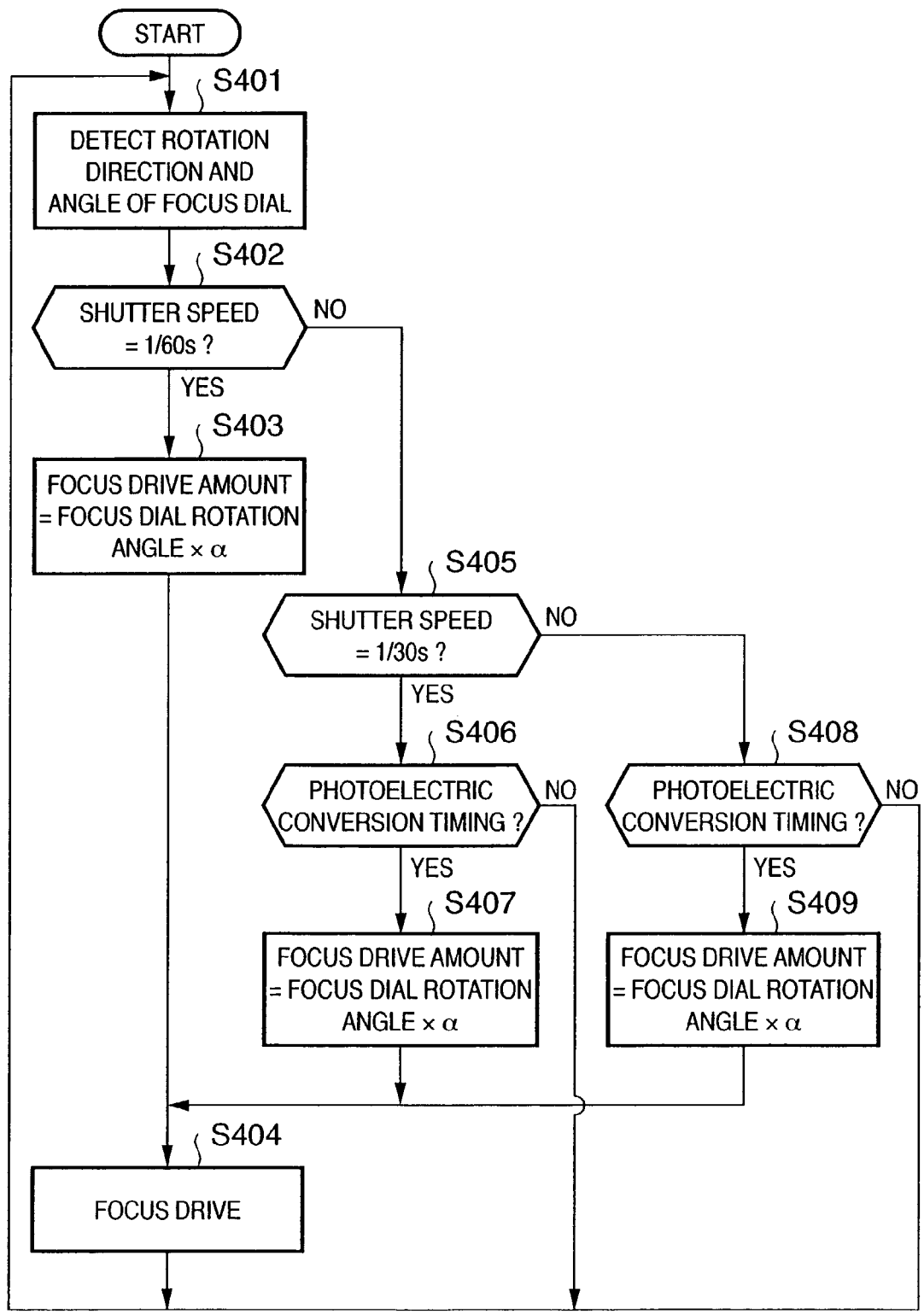
FIG. 4 is a flow chart showing the control sequence of a camera control microcomputer in the video camera according to the second embodiment.
Figure 5:
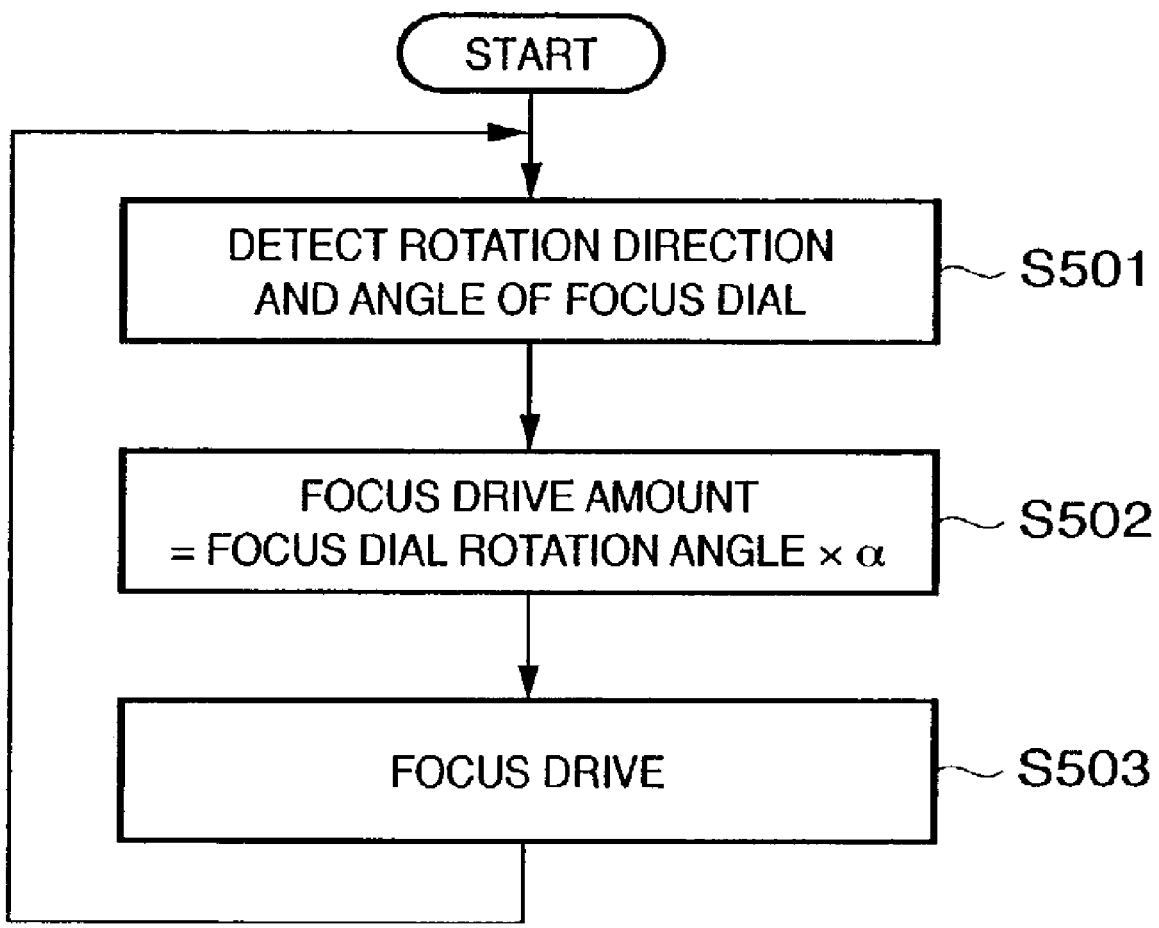
FIG. 5 is a flow chart showing the control sequence of a camera control microcomputer in a conventional video camera.

The process shown in the flow chart of FIG. 4 is controlled to start from step S401 and to return to step S401 within one field. In step S401, the camera control microcomputer 114 detects the rotation direction and angle of the manual focus dial 115 for one field. The camera control microcomputer 114 checks in step S402 if the shutter speed is 1/60 sec. If the shutter speed is 1/60 sec, the flow advances to step S403; otherwise, the flow advances to step S405.

If the shutter speed is 1/60 sec, the camera control microcomputer 114 determines the drive amount of the focus lens 105 for one field in accordance with the rotation angle of the manual focus dial 115 in step S403. That is, the drive amount of the focus lens 105 for one field=the rotation angle of the manual focus dial 115×α (α: a conversion coefficient (constant)). In step S404, the camera control microcomputer 114 controls the focus compensation lens driver 107 and focus compensation lens motor 106 to drive the focus lens 105 by the drive amount determined in step S403 in a direction corresponding to the rotation direction of the manual focus dial 115 detected in step S401.

On the other hand, if the shutter speed is not 1/60 sec, the camera control microcomputer 114 checks in step S405 if the shutter speed is 1/30 sec. If the shutter speed is 1/30 sec, the flow advances to step S406; otherwise, the flow advances to step S407.

If the shutter speed is 1/30 sec, the camera control microcomputer 114 checks in step S406 if the photoelectric conversion timing is reached. If it is determined that the photoelectric conversion timing is reached, the flow advances to step S407, and the microcomputer 114 determines the drive amount of the focus lens 105 for one field in accordance with the rotation angle of the manual focus dial 115. That is, the drive amount of the focus lens 105 for one field=the rotation angle of the manual focus dial 115×α. In step S404, the camera control microcomputer 114 controls the focus compensation lens driver 107 and focus compensation lens motor 106 to drive the focus lens 105 by the drive amount determined in step S407 in a direction corresponding to the rotation direction of the manual focus dial 115 detected in step S401. On the other hand, if the camera control microcomputer 114 determines that the photoelectric conversion timing is not reached, the flow returns to step S401 without driving the focus lens 105.

On the other hand, if the shutter speed is not 1/30 sec, since it is determined in this embodiment that the shutter speed is 1/15 sec, the camera microcomputer 114 checks in step S408 if the photoelectric conversion timing is reached. If it is determined that the photoelectric conversion timing is reached, the flow advances to step S409, and the microcomputer 114 determines the drive amount of the focus lens 105 for one field in accordance with the rotation angle of the manual focus dial 115. That is, the drive amount of the focus lens 105 for one field=the rotation angle of the manual focus dial 115×α. In step S404, the camera control microcomputer 114 controls the focus compensation lens driver 107 and focus compensation lens motor 106 to drive the focus lens 105 by the drive amount determined in step S409 in a direction corresponding to the rotation direction of the manual focus dial 115 detected in step S401. On the other hand, if the camera control microcomputer 114 determines that the photoelectric conversion timing is not reached, the flow returns to step S401 without driving the focus lens 105.

Figure 2:
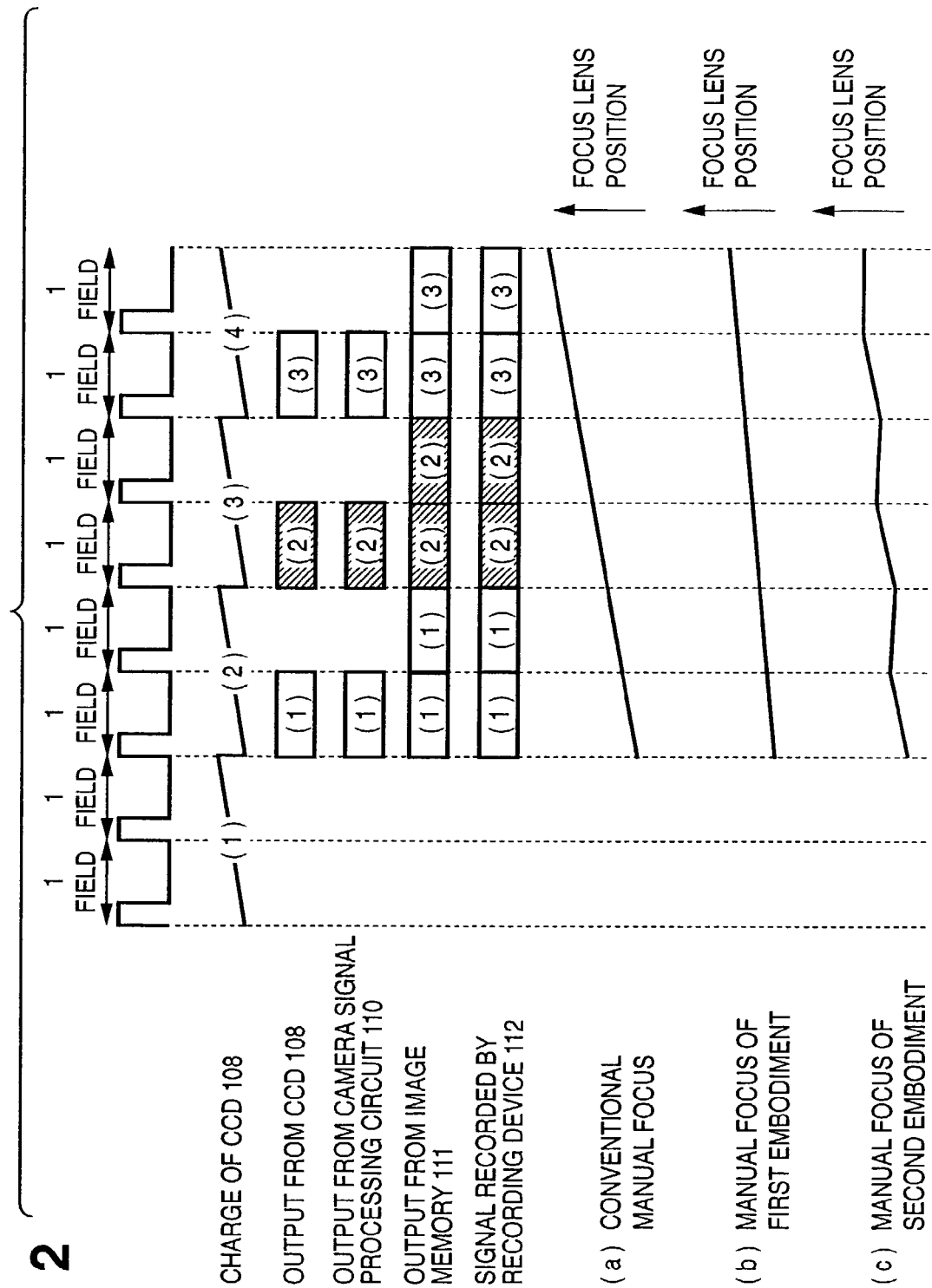
FIG. 2 is an explanatory view showing the relationship among the charge signals of a CCD, the outputs from the CCD, the outputs from a camera signal processing circuit, the outputs from an image memory, signals recorded by a recording device, and the focus lens position in the video camera according to the first and second embodiments.

As described above, according to the second embodiment, since the control for determining the drive amount of the focus lens 105 for one field is done in accordance with the photoelectric conversion period, an optimal manual focus moving amount per field that matches the shutter speed in the slow shutter mode can be implemented, as shown in FIG. 2(*c*) and, hence, the moving amount of the focus lens 105 can be smaller than that at a normal shutter speed shown in FIG. 2(*a*). Therefore, the conventional problem that the focus lens repetitively overshoots an in-focus position, and the focal point position cannot be determined before and after an in-focus point even when the photographer recognizes such state and makes manual focus operation in the reverse direction can be prevented, and the focal point can be reliably adjusted to an in-focus point.

Other Embodiments

The first and second embodiments have exemplified the video camera with the arrangement shown in FIG. 1. However, the present invention is not limited to such specific arrangement, and an image sensing optical system, drive system, control system, recording system, and display system can have arbitrary arrangements.

The first and second embodiments have exemplified a standalone video camera. However, the present invention is not limited to such specific arrangement, and can be applied to a system in which the video camera of the present invention is connected to a display device such as a liquid crystal display or the like, and an information processing apparatus such as a personal computer or the like to be able to communicate with each other.

Note that the present invention may be applied to either a system constituted by a plurality of devices, or an apparatus consisting of a single device. The objects of the present invention are also achieved by supplying a medium such as a storage medium or the like, which stores a program code of software that implements the functions of the above-mentioned embodiments to the system or apparatus, and reading out and executing the program code stored in the medium such as a storage medium or the like by a computer (or a CPU or MPU) of the system or apparatus.

In this case, the program code itself read out from the storage medium implements the functions of the above-mentioned embodiments, and the medium such as a storage medium or the like which stores the program code constitutes the present invention. As the medium such as a storage medium or the like for supplying the program code, for example, a floppy disk (tradename), hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the above embodiments, even in a slow shutter mode in which the exposure time of image sensing means that converts an object image into an image signal is set to be longer than one field period, the conventional problem that the focus lens repetitively overshoots an in-focus position, and the focal point position cannot be determined before and after an in-focus point even when the user recognizes such state and makes manual focus operation in the reverse direction can be prevented, and the focal point can be reliably adjusted to an in-focus point.

The present invention is not limited to the above embodiments and various changes and modifications can be made within the spirit and scope of the present invention. Therefore, to apprise the public of the scope of the present invention the following claims are made.

What is claimed is:

1. A focus adjustment apparatus comprising:
   a focus adjustment device that drives a focus lens of an image sensing optical system to adjust a focal point of the image sensing optical system in response to a manual focusing operation by a user;
   a change device that controls said focus adjustment device to decrease a focus adjustment drive speed of the focus lens caused by the manual focusing operation by the user as a photoelectric conversion cycle in which an image sensing device converts an object image received via the image sensing optical system into an image signal becomes longer; and a display device that displays images corresponding to electric signals which are periodically and photo-electrically converted by the image sensing device.

2. The apparatus according to claim 1, wherein said change device changes a focus adjustment drive amount per unit time of said focus adjustment device corresponding to the manual operation in accordance with the cycle in which the image sensing device converts an object image received via the image sensing optical system into an image signal.

3. The apparatus according to claim 1, further comprising: a display device for displaying an image signal periodically converted by the image sensing device.

4. The apparatus according to claim 1, wherein said focus adjustment device drives to adjust a focal point at a drive speed corresponding to an operation speed of a manual operation member.

5. An image sensing apparatus comprising: a focus adjustment apparatus of claim 1.

6. A focus adjustment apparatus comprising:
a focus adjustment device that drives a focus lens of an image sensing optical system to adjust a focal point of the image sensing optical system in response to a manual focusing operation by a user;
a change device that controls said focus adjustment device to decrease a time in which said focus adjustment device moves the focus lens of the image sensing optical system in response to the manual focusing operation by the user as a photoelectric conversion cycle in which an image sensing device converts an object image received via the image sensing optical system into an image signal becomes longer;
a display device that displays images corresponding to electric signals which are periodically and photo-electrically converted by the image sensing device.

7. The apparatus according to claim 6, wherein said change device prolongs the response time of said focus adjustment device to the manual operation as the cycle in which the image sensing device converts an object image received via the image sensing optical system into an image signal becomes longer.

8. A focus adjustment method for driving a focus lens of an image sensing optical system to adjust a focal point of the image sensing optical system in response to a manual focusing operation by a user, comprising the steps of:
decreasing a focus adjustment drive speed of the focus lens caused by the manual focusing operation by the user as a photoelectric conversion cycle in which an image sensing device converts an object image received via the image sensing optical system into an image signal becomes longer; and
displaying images corresponding to electric signals which are periodically and photo-electrically converted by the image sensing device on a display device.

9. A focus adjustment method for driving a focus lens of an image sensing optical system to adjust a focal point of the image sensing optical system in response to a manual focusing operation by a user, comprising the steps of:
decreasing a time in which the focus lens of the image sensing optical system is moved in response to the manual focusing operation by the user as a photoelectric conversion cycle in which an image sensing device converts an object image received via the image sensing optical system into an image signal becomes longer; and
displaying images corresponding to electric signals which are periodically and photo-electrically converted by the image sensing device on a display device.

10. A computer readable medium that stores a control program for a focus adjustment apparatus, wherein the control program is executed by a processing unit for driving a focus lens of an image sensing optical system to adjust a focal point of the image sensing optical system in response to a manual focusing operation by a user, comprising the steps of:
decreasing a focus adjustment drive speed of the focus lens caused by the manual focusing operation by the user as a photoelectric conversion cycle in which an image sensing device converts an object image received via the image sensing optical system into an image signal becomes longer; and
displaying images corresponding to electric signals which are periodically and photo-electrically converted by the image sensing device on a display device.

11. A computer readable medium that stores a control program for a focus adjustment apparatus, wherein the control program is executed by a processing unit for driving a focus lens of an image sensing optical system to adjust a focal point of the image sensing optical system in response to a manual focusing operation by a user, comprising the steps of:
decreasing a time in which the focus lens of the image sensing optical system is moved in response to the manual focusing operation by the user as a photoelectric conversion cycle in which an image sensing device converts an object image received via the image sensing optical system into an image signal becomes longer; and
displaying images corresponding to electric signals which are periodically and photo-electrically converted by the image sensing device on a display device.

* * * * *